United States Patent Office 3,353,719
Patented Nov. 21, 1967

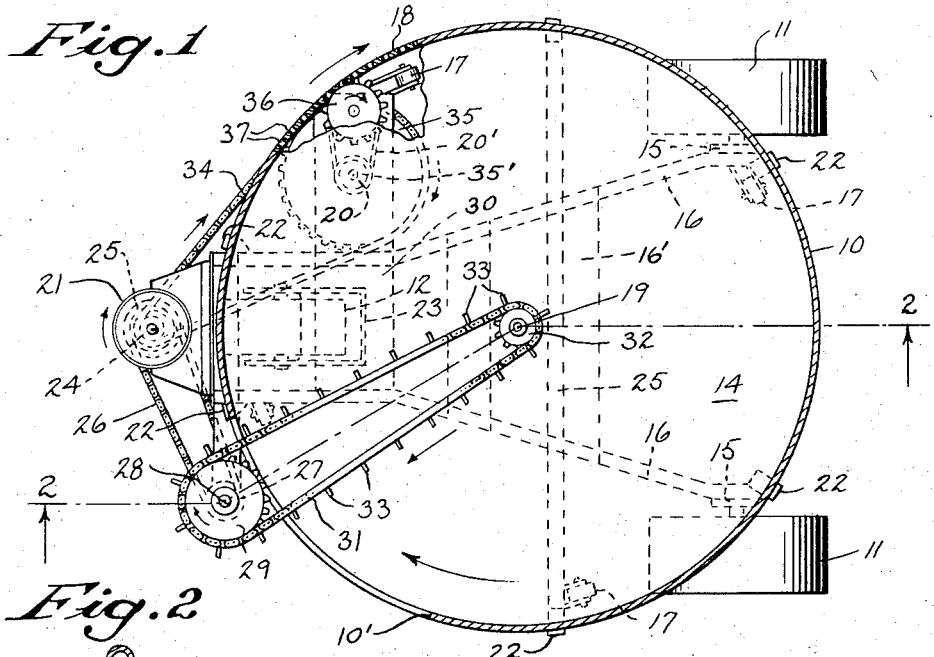

3,353,719
FEED DISPENSING CARTS FOR LIVESTOCK
AND THE LIKE
George B. Bruecker, 1412 Oak Ridge,
Kaukauna, Wis. 54130
Filed Apr. 5, 1966, Ser. No. 540,404
8 Claims. (Cl. 222—178)

This invention relates to improvements in feed dispensing carts for livestock and the like.

Heretofore a number of mobile carts have been designed for hauling and dispensing feed or bedding material for cattle and other animals, and while such prior carts are generally satisfactory for their intended purpose, they are bulky and unmaneuverable, which can create a problem in the many barns and feeding stations having narrow or restricted passageways adjacent the livestock stalls. With this in mind, one of the principal objects of the present invention is to provide a novel feed cart characterized by a compact, cylindrical body design which permits said cart to be easily maneuvered even in close, crowded quarters.

A further object of the present invention is to provide an improved livestock feed cart which is cylindrical in form, as described, which novel design permits said cart to be constructed for substantially less cost than conventional rectangular feed carts.

A further object is to provide a feed delivery cart having a novel power-driven dispensing assembly for automatically discharging feed while said cart is in transit, and which dispensing assembly is faster and more efficient than the dispensing mechanisms employed in conventional feed carts, thereby facilitating and reducing the time required for the livestock feeding operation.

Still further objects of the present invention are to provide a new and improved feed cart for livestock and the like which is economical to operate, which is rugged and durable in construction, and which is otherwise particularly well adapted for its intended purposes.

With the above and other objects in view, which other objects and advantages of the present invention will appear hereinafter, the invention comprises the new and improved livestock feed dispensing cart described in the following specification and also any and all modifications or variations thereof as may come within the spirit of said invention, and within the scope of the appended claims.

In the accompanying drawing, wherein there is illustrated one preferred embodiment of the invention, and wherein the same reference numerals designate the same parts in both of the views:

FIG. 1 is a horizontal sectional view, taken along line 1—1 of FIG. 2, showing the novel feed dispensing assembly employed in the present invention; and FIG. 2 is a vertical sectional view of the cart taken along line 2—2 of FIG. 1.

Referring now more particularly to the drawings, the present cart includes an upright cylindrical feed container or body 10 which is mounted on a pair of nonsteerable forward wheels 11 and a swivel rear wheel 12 secured to the underside of said cart by brackets 15, 23, respectively. Said body is provided with a rear handle 13 (FIG. 2) to permit an operator to readily push said cart along the livestock stalls or feeding trough, and formed in the lower side portion of said body in an opening 10′ which functions as the feed discharge opening, as will be described.

The cylindrical design of said cart body 10 is one of the principal novel features of the present invention inasmuch as it provides a compact, relatively narrow unit which can be more readily maneuvered than prior feed carts which are rectangular in design. It has been found that the present cart can travel around restricted corners and get into places not accessible to conventional rectangular feed carts whose protruding corners prevent or impede the turning and maneuvering of said carts, particularly in the many barns having narrow or confined passageways. Moreover, as mentioned, the simple, cylindrical design of the present cart permits it to be built for a fraction of the cost of conventional rectangular feed carts.

As best appears in FIG. 2, spaced closely below said cylindrical cart body 10 is a circular floor member 14, which is rotatable as will be described, and carried integrally on the underside of said floor member is an annular ring 18 having a plurality of evenly-spaced openings 37 therein. Spaced below said rotatable floor member 14 is a rigid, nonrotatable cross strut 25 and a pair of rigid diverging struts 16 which form the support means for the aforementioned wheels 11, 12, and extending between the latter struts is a center panel 16′. Brackets 22 project upwardly from the ends of said struts and function to rigidly secure the same to said cylindrical body 10, and carried adjacent the outer ends of said struts 16, 25 are upright guide and support casters 17 which are positioned to rotatably support the underside of said floor member 14 adjacent its periphery. Said floor member is rotatably carried by a vertical center shaft 19 which is mounted in and projects above the rigid center panel 16′, thereby permitting the rotation of said floor member 14 relative to the cart body 10, and carried on the upper, projecting end of said vertical shaft 19 is an idler sprocket 32.

Referring again to FIG. 2 of the drawing, it will be seen that a motor 21 is mounted on the rearward portion of the present cart and includes a depending drive shaft 21′ having a first sprocket 24 thereon and a larger coaxial sprocket 25 immediately therebelow. Said sprocket 24 has an endless chain 34 trained therearound and around a reduction gear 35 mounted on an upright shaft 35′ supported by a rigid horizontal member 30 below the floor 14, and carried on the upper portion of said shaft 35′ is a sprocket 36 which is driven by means of sprocket 20 and chain 20′. Said sprocket 36 is provided with teeth which are designed to mesh within the aforementioned spaced openings 37 in the drive ring 18 fast on the underside of the rotatable floor member 14, and when the motor 21 is actuated to turn the reduction gear 35 and sprocket 36 the latter functions to progressively engage said drive ring apertures 37 to rotate said drive ring and the attached floor 14 in the direction indicated by the arrows in FIG. 1, said floor 14 being movably supported on the casters 17, as described.

The aforementioned sprocket 25 mounted on the lower end of the motor drive shaft 21′ is provided with an endless chain 26 drivingly connecting the same to sprocket 27 on the lower end of a vertical shaft 28 which is supported outside the periphery of the cart cylindrical body 10 in alignment with the discharge opening 10′, and carried on the upper end of said shaft 28 is a sprocket 29. Said sprocket 29 has an endless chain 31 trained thereabout and about the idler sprocket 32 on the upper end of central shaft 19, said chain extending radially-outwardly through the aforementioned discharge opening 10′ in the lower portion of the cart body, and carried in spaced relationship on said endless chain 31 are a plurality of enlarged, feed-engaging lugs or fingers 33 which are designed to pass closely above the rotatable floor member 14. When the motor 21 is actuated to turn the sprocket 29 said chain 31 is driven in the direction indicated by the arrows in FIG. 1.

In the use of the present invention, the cart body 10 is filled with feed or the like, and as the operator manually pushes said cart adjacent the livestock stalls or feed trough the motor-driven floor 14 is continuously revolved while the radially-disposed endless chain 31 simultaneously travels about its mountings. Thus feed carried on the bottom of said rotating floor member 14 is continuously moved into contact with said traveling chain 31 and the fingers 33 thereon function to engage and convey said feed laterally outwardly and discharge it through the opening 10' in the lower portion of said cart, said feed or other material being deposited in the adjacent livestock stalls or feed trough.

In the illustrated form of the present invention the feed-conveyor chain 31 is designed to continuously eject a 4" level of feed, thus providing a much faster and more efficient dispensing mechanism than the auger-type dispensing devices employed in conventional feed carts. A further advantage of the present invention is that with said dispensing mechanism there is little possibility of the feed sticking or bridging in the lower portion of the container, as sometimes happens with conventional feed carts.

Suitable controls (not shown) are provided for the operation of the motor 21, of course, and the operator may readily control the dispensing operation as desired. The result is that the quantity of feed deposited at each feeding station or stall may be readily metered, depending upon the requirements of each particular animal.

From the foregoing detailed description it will be seen that the present invention provides a novel mobile cart for distributing livestock feed or bedding material having a number of advantages over the carts heretofore used for the same purposes. Principally, the novel compact cylindrical design of said new cart permits it to be easily maneuvered even in close, crowded quarters, thereby permitting its use in many barns having narrow or restricted passageways adjacent the livestock stalls and wherein it is impossible to maneuver a conventional rectangular feed cart. In addition, the present cylindrical cart is substantially less expensive to construct than said prior carts, it is efficient and relatively inexpensive to operate, and it is rugged and durable in construction.

It is to be understood that the present invention is not to be limited or confined to a livestock feed dispensing cart identical in all respects to that illustrated and hereinabove described. It is contemplated that numerous variations or modifications thereof will occur to those skilled in the art, and it is intended to cover herein not only the illustrated form of the invention but also any and all modifications thereof as may come within the spirit of said invention, and within the scope of the following claims.

What I claim is:

1. A mobile feed-dispensing cart, comprising, an upright cylindrical body adapted to contain a quantity of feed, said body having an open bottom and having a feed discharge opening in its peripheral surface adjacent its lower end; a circular, rotatable floor member spaced closely below the bottom of said cylindrical body; a drive ring rigid on the underside of said rotatable floor member, said drive ring having a plurality of spaced openings therein; frame elements spaced below said rotatable floor member; a plurality of casters on said frame elements movably supporting said rotatable floor member; wheel means carried by and below said frame elements; a vertical center shaft extending upwardly through said rotatable floor member, said center shaft having an idler sprocket on its upper end; a motor mounted on the exterior of said cart body; said motor having a drive shaft; a vertical conveyor drive shaft on the exterior of said body in alignment with said discharge opening, said conveyor shaft having a sprocket on its upper end spaced above said floor member; means drivingly connecting said conveyor drive shaft to said motor drive shaft; an endless conveyor chain trained about said conveyor shaft sprocket and about said center shaft idler sprocket, said chain extending radially outwardly through said discharge opening, and said conveyor chain having a plurality of spaced feed-engaging fingers thereon adapted to pass closely over said floor member to engage and convey feed thereon radially outwardly through said discharge opening during travel of said conveyor chain; a toothed drive sprocket mounted below said floor member adjacent its periphery and positioned to engage within the drive ring openings on the underside of said rotatable floor member; means drivingly connecting said drive sprocket to said motor, whereby said sprocket teeth will progressively engage within said drive ring openings to rotatably drive said ring and floor member, and thereby causing feed carried on said rotating floor member to be continuously moved into contact with said conveyor chain during the dispensing operation; and motor control means permitting an operator to control said dispensing operation.

2. The feed-dispensing cart recited in claim 1 wherein said wheel means include a turnable wheel to permit the turning and maneuvering of said cart.

3. A mobile feed-dispensing cart, comprising: an upright body adapted to contain a quantity of feed, said body having a feed discharge opening adjacent its lower end; a rotatable floor member at the bottom of said body; a center idler shaft extending upwardly above said floor member; a motor mounted on the exterior of said cart body, said motor having a drive shaft; a vertical conveyor drive shaft on the exterior of said body in alignment with said discharge opening; means rotatably drivingly connecting said conveyor drive shaft to said motor drive shaft; an endless conveyor member trained about said conveyor shaft and about said center idler shaft, said conveyor member extending radially outwardly through said discharge opening and having means thereon adapted to engage and convey feed on said floor member radially outwardly through said opening; and floor driving means connected to said motor and adapted to rotatably drive said floor member to cause feed thereon to be continuously moved into contact with said endless conveyor member during the dispensing operation.

4. The mobile feed-dispensing cart recited in claim 3 wherein said floor driving means comprises a drive ring mounted below and rigidly connected to said floor, said drive ring having a plurality of spaced openings therein; and a rotatable drive sprocket connected to said motor and positioned to progressively engage within said drive ring openings to rotate said ring and floor members.

5. The mobile feed-dispensing cart recited in claim 3 wherein sprockets are carried on the upper ends of said conveyor shaft and center idler shaft, and wherein said endless conveyor member comprises a chain drivably trained about said sprockets and having feed-engaging fingers projecting therefrom.

6. The mobile feed-dispensing cart recited in claim 3 having frame elements spaced below said floor member, having a plurality of casters on said frame elements movably supporting said rotatable floor member, and having ground-engaging wheel means carried by and below said frame elements.

7. The mobile feed-dispensing cart recited in claim 6 wherein said wheel means includes a turnable wheel to permit the turning and maneuvering of said cart.

8. The mobile feed-dispensing cart recited in claim 3 and having control means permiting an operator to control said motor-driven dispensing means.

References Cited

UNITED STATES PATENTS 1,828,317  10/1931  Clapp _____ 222—413 X
3,198,398  8/1965  Schreiber _____ 222—176

ROBERT B. REEVES, *Primary Examiner.*

KENNETH N. LEIMER, *Examiner.*